(12) United States Patent
Sakamoto et al.

(10) Patent No.: US 11,855,541 B2
(45) Date of Patent: Dec. 26, 2023

(54) SYSTEM POWER SUPPLY DEVICE WITH CONTROL FOR SWITCHING THE NUMBER OF POWER CONVERSION UNITS

(71) Applicant: Murata Manufacturing Co., Ltd., Kyoto-fu (JP)

(72) Inventors: Norikazu Sakamoto, Nagaokakyo (JP); Tatsuya Hosotani, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 183 days.

(21) Appl. No.: 17/470,800

(22) Filed: Sep. 9, 2021

(65) Prior Publication Data

US 2021/0408916 A1     Dec. 30, 2021

Related U.S. Application Data

(63) Continuation of application No. PCT/JP2019/048098, filed on Dec. 9, 2019.

(30) Foreign Application Priority Data

Mar. 14, 2019  (JP) ................... 2019-046655

(51) Int. Cl.
  *H02M 3/335*     (2006.01)
  *H02M 1/00*      (2006.01)
  *H02M 3/158*     (2006.01)

(52) U.S. Cl.
  CPC ..... *H02M 3/33507* (2013.01); *H02M 1/0058* (2021.05); *H02M 3/1584* (2013.01); *H02M 3/33569* (2013.01)

(58) Field of Classification Search
  CPC .. H02M 3/1582; H02M 3/156; H02M 3/1584; H02M 3/1586; H02M 3/285;
(Continued)

(56) References Cited

U.S. PATENT DOCUMENTS

| 7,928,704 B2* | 4/2011 | Huang ............... H02M 3/1588 323/271 |
| 8,618,788 B2* | 12/2013 | Trivedi ............... H02M 3/1584 323/283 |

(Continued)

FOREIGN PATENT DOCUMENTS

| JP | 2011-147269 A | 7/2011 |
| JP | 2012-080744 A | 4/2012 |

(Continued)

OTHER PUBLICATIONS

International Search Report issued in PCT/JP2019/048098; dated Jan. 7, 2020.

(Continued)

*Primary Examiner* — Jeffrey A Gblende
(74) *Attorney, Agent, or Firm* — Studebaker & Brackett PC

(57) ABSTRACT

A plurality of power conversion units each include an inductor, a switching circuit, and a PWM control IC. An MPU outputs control signals to the plurality of power conversion units. Output parts of the plurality of power conversion units are connected to an output terminal in a parallel manner. Operating number signal generating circuits of feedback signal generating circuits generate an operating number signal Sop on the basis of individual current signals based on inductor currents in the plurality of power conversion units, and output the operating number signal to the MPU. The MPU sets operations of the plurality of power conversion units on the basis of the operating number signal, and outputs the control signals including the settings of the operations of the power conversion units.

20 Claims, 9 Drawing Sheets

(58) Field of Classification Search
CPC .... H02M 3/33561; H02M 7/49; H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 1/007; H02M 1/0009; H02M 1/08; H02M 3/1588; H02M 7/5395; H02M 1/14; H02J 3/46; H02J 3/38
See application file for complete search history.

(56) References Cited

U.S. PATENT DOCUMENTS

| | | | | |
|---|---|---|---|---|
| 8,816,657 | B2* | 8/2014 | Wang | H02M 3/1584 323/272 |
| 9,350,244 | B2* | 5/2016 | Tang | H02M 3/158 |
| 9,520,788 | B2* | 12/2016 | Kobayashi | H02M 3/1584 |
| 10,917,015 | B2* | 2/2021 | Trichy | H02M 3/1584 |
| 2006/0212138 | A1 | 9/2006 | Zhang | |
| 2012/0086416 | A1* | 4/2012 | Kudo | G06F 1/26 323/265 |
| 2017/0054368 | A1* | 2/2017 | Tschirhart | G06F 1/3296 |

FOREIGN PATENT DOCUMENTS

| | | |
|---|---|---|
| JP | 2013-094058 A | 5/2013 |
| JP | 2017-135812 A | 8/2017 |

OTHER PUBLICATIONS

Written Opinion of the International Searching Authority issued in PCT/JP2019/048098; dated Jan. 7, 2020.

* cited by examiner

SYSTEM POWER SUPPLY DEVICE WITH CONTROL FOR SWITCHING THE NUMBER OF POWER CONVERSION UNITS

CROSS-REFERENCE TO RELATED APPLICATIONS

This application claims benefit of priority to International Patent Application No. PCT/JP2019/048098, filed Dec. 9, 2019, and to Japanese Patent Application No. 2019-046655, filed Mar. 14, 2019, the entire contents of each are incorporated herein by reference.

BACKGROUND

Technical Field

The present disclosure relates to a system power supply device having a system configuration in which a plurality of power conversion units including switching circuits are connected in parallel to one another.

Background Art

Nowadays, there is a demand for low-voltage, large-current power supply devices. As power supply devices meeting the demand, multiphase converters are described in, for example, Japanese Unexamined Patent Application Publication No. 2011-147269 and Japanese Unexamined Patent Application Publication No. 2013-94058.

A multiphase converter includes a plurality of power conversion units. The plurality of power conversion units are connected in parallel to one another. The multiphase converter is capable of supplying a large current by outputting output currents of all the plurality of power conversion units together. Furthermore, in the multiphase converter, phases of switching frequencies for the plurality of power conversion units are shifted from one another so that a stable output current can be achieved.

SUMMARY

The state of a load to which a power supply device is connected changes with time according to an operation of a load circuit or the like, and load current and power consumption vary with time. In this case, it is desirable that, to increase the efficiency of the power supply system, the number of power conversion units that are to operate (operating number) be changed in accordance with the power consumption and operation mode of the load.

However, in conventional power supply devices, control for switching the operating number in accordance with the state of a load (power consumption and operation mode) cannot be performed with a simple circuit configuration.

Thus, the present disclosure provides a power supply device that is capable of achieving, with a simple circuit configuration, control for switching an operating number in accordance with the state of a load.

A power supply device according to the present disclosure includes a plurality of power conversion units, a common control unit, a common output terminal, and operating number signal generating circuits. The plurality of power conversion units each include an inductor, a switching circuit, and an individual analog controller. The common control unit outputs control signals to the plurality of power conversion units. Output parts of the plurality of power conversion units are connected to the common output terminal in a parallel manner. The operating number signal generating circuits generate an operating number signal on the basis of individual current signals based on inductor currents of the plurality of power conversion units, and output the operating number signal to the common control unit. The common control unit sets operations of the individual analog controllers of the plurality of power conversion units on the basis of the operating number signal, and outputs the control signals including the settings of the operations of the individual analog controllers.

With the configuration described above, the operating number signal is generated in accordance with the currents flowing to the inductors of the plurality of power conversion units, and a load current to be output to the load is calculated on the basis of the operating number signal. With the load current calculated described above, the state of the load can be determined, and the operating number according to the state of the load can be set.

According to the present disclosure, an increase in the efficiency, a decrease in the size, and a reduction in the noise of a system power supply device that is capable of configuring a simple circuit capable of switching an operating number in accordance with the state of a load changing according to the operation mode and power consumption of a load circuit and includes a plurality of power conversion units, can be achieved.

DETAILED DESCRIPTION

First Embodiment

Figure 1:
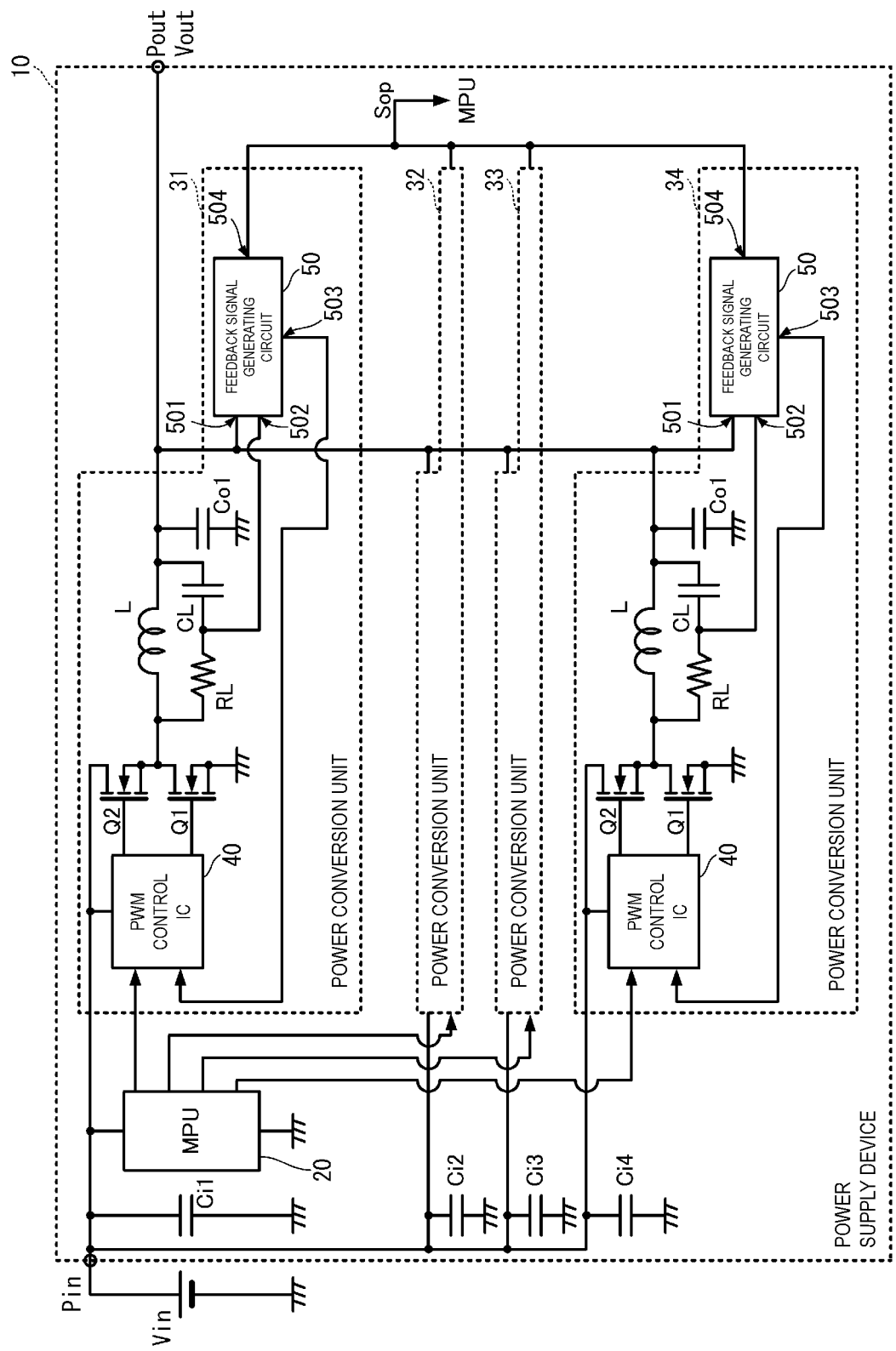
FIG. 1 is a circuit block diagram of a power supply device according to a first embodiment.

A power supply device according to a first embodiment of the present disclosure will be described with reference to drawings. FIG. 1 is a circuit block diagram of a power supply device 10 according to the first embodiment.

As illustrated in FIG. 1, the power supply device 10 includes an MPU 20, a power conversion unit 31, a power conversion unit 32, a power conversion unit 33, and a power conversion unit 34. In this embodiment, the number of power conversion units is four. However, the configuration of this embodiment can be applied to the present disclosure as long as a plurality of power conversion units are provided. The power supply device 10 also includes an input terminal Pin and an output terminal Pout. The output terminal Pout corresponds to a "common output terminal" in the present disclosure, and the voltage of the output terminal Pout corresponds to an output voltage Vout. The power supply device 10 corresponds to a "system power supply device" according to the present disclosure. A system power supply device represents a power supply device that includes a plurality of power conversion units and properly controls the operating number of power conversion units that operate and the operating state of the plurality of power conversion units in accordance with the state of a load, unlike, for example, a switching power supply including only one power conversion unit.

The input terminal Pin is connected to an external DC voltage source. A DC input voltage Vin is supplied to the power supply device 10 through the input terminal Pin. The output terminal Pout is connected to a load, which is not illustrated in the drawing.

The MPU 20 is connected to the input terminal Pin, and power is supplied to the MPU 20 through the input terminal Pin. A step-down circuit, which is omitted in the drawing, is provided between the MPU 20 and the input terminal Pin. A voltage obtained by stepping down the input voltage Vin is supplied to the MPU 20. This power supply line is connected to a ground reference potential with an input capacitor Ci1 interposed therebetween.

The MPU 20 is a programmable microprocessor (Micro Processing Unit). The MPU 20 generates, by digital signal processing, a control signal including setting of an operation mode. For example, a control signal includes a clock oscillation control signal, an enable signal, and the like.

The MPU 20 is connected to the power conversion unit 31, the power conversion unit 32, the power conversion unit 33, and the power conversion unit 34. The MPU 20 outputs a generated control signal to each of the power conversion unit 31, the power conversion unit 32, the power conversion unit 33, and the power conversion unit 34.

For example, the MPU 20 outputs an enable (valid) signal to an individual analog controller of a power conversion unit that is operating, out of the plurality of power conversion units, and outputs a disable (non-valid) signal to an individual analog controller of a power conversion unit that is not operating. These signals serve as setting signals for setting operation modes of the individual analog controllers. Furthermore, the MPU 20 sets an operation mode of a switch circuit in each of the individual analog controllers of the plurality of power conversion units.

A clock oscillation control signal provides a switching frequency of a switching circuit included in each power conversion unit. There is a phase difference among clock oscillation signals of clock oscillation control signals. The phase difference is set according to the number of operating power conversion units. Accordingly, the MPU 20 causes the power supply device 10 to operate as a multiphase converter.

The MPU 20 determines, in accordance with an operating number signal Sop from a terminal 504, the number of operating power conversion units. The terminals 504 are common output ends of the power conversion unit 31, the power conversion unit 32, the power conversion unit 33, and the power conversion unit 34. Furthermore, the MPU 20 determines a phase difference according to the number of operating power conversion units, and sets a control signal to an operating power conversion unit.

The power conversion unit 31, the power conversion unit 32, the power conversion unit 33, and the power conversion unit 34 are connected to the input terminal Pin, and power is supplied to the power conversion unit 31, the power conversion unit 32, the power conversion unit 33, and the power conversion unit 34 through the input terminal Pin. A power supply line for the power conversion unit 31 is connected to the ground reference potential with the input capacitor Ci1 interposed therebetween. A power supply line for the power conversion unit 32 is connected to the ground reference potential with an input capacitor Ci2 interposed therebetween. A power supply line for the power conversion unit 33 is connected to the ground reference potential with an input capacitor Ci3 interposed therebetween. A power supply line for the power conversion unit 34 is connected to the ground reference potential with an input capacitor Ci4 interposed therebetween.

An output end of the power conversion unit 31, an output end of the power conversion unit 32, an output end of the power conversion unit 33, and an output end of the power conversion unit 34 are connected to the output terminal Pout in a parallel manner.

The power conversion unit 31, the power conversion unit 32, the power conversion unit 33, and the power conversion unit 34 are formed of analog circuits and have the same circuit configuration. Hence, a specific circuit configuration of only the power conversion unit 31 will be described below.

As illustrated in FIG. 1, the power conversion unit 31 includes a PWM control IC 40, a switching element Q1, a switching element Q2, an inductor L, an output capacitor Col, a resistor RL, a capacitor CL, and a feedback signal generating circuit 50. The PWM control IC 40 corresponds to an "individual analog controller" in the present disclosure. A circuit including the switching element Q1 and the switching element Q2 corresponds to a "switching circuit" in the present disclosure.

The PWM control IC 40 is connected to the input terminal Pin, and power is supplied to the PWM control IC 40 through the input terminal Pin. A control signal is input to the PWM control IC 40 from the MPU 20. A composite feedback signal derived from a voltage feedback signal and a current feedback signal is input to the PWM control IC 40. The PWM control IC 40 generates a switching control signal based on PWM (pulse width modulation) control from the control signal and the composite feedback signal for the switching element Q1 and the switching element Q2.

The gate of the switching element Q2 is connected to the PWM control IC 40, the drain of the switching element Q2 is connected to the input terminal Pin, and the source of the switching element Q2 is connected to the drain of the switching element Q1. The gate of the switching element Q1 is connected to the PWM control IC 40, and the source of the switching element Q1 is connected to the ground reference potential.

A switching control signal for the switching element Q2 is input to the gate of the switching element Q2 from the PWM control IC 40. A switching control signal for the switching element Q1 is input to the gate of the switching element Q1 from the PWM control IC 40.

One end of the inductor L is connected to a connection point of the source of the switching element Q2 and the drain of the switching element Q1.

The other end of the inductor L is connected to the output terminal Pout. The other end of the inductor L is connected to the ground reference potential with the output capacitor Col interposed therebetween.

A series circuit including the resistor RL and the capacitor CL is connected in parallel to the inductor L. By making the inductance of the inductor L, the resistance of the resistor RL, and the capacitance of the capacitor CL have a specific relationship, a voltage signal corresponding to current flowing in the inductor L can be detected without loss.

The feedback signal generating circuit 50 includes a terminal 501, a terminal 502 a terminal 503, and the terminal 504. The terminal 501 is connected to the output terminal Pout, that is, a parallel connection part of the output end of the power conversion unit 31, the output end of the power conversion unit 32, the output end of the power conversion unit 33, and the output end of the power conversion unit 34. The terminal 502 is connected to a connection point of the resistor RL and the capacitor CL. The terminal 503 is connected to the PWM control IC 40.

The terminal 504 is connected in parallel to a terminal 504 of a feedback signal generating circuit 50 of another power conversion unit. That is, the terminals 504 of the feedback signal generating circuits 50 of the power conversion unit 31, the power conversion unit 32, the power conversion unit 33, and the power conversion unit 34 are connected in parallel to one another. The line that is connected in the parallel manner is connected to the MPU 20.

Figure 2:
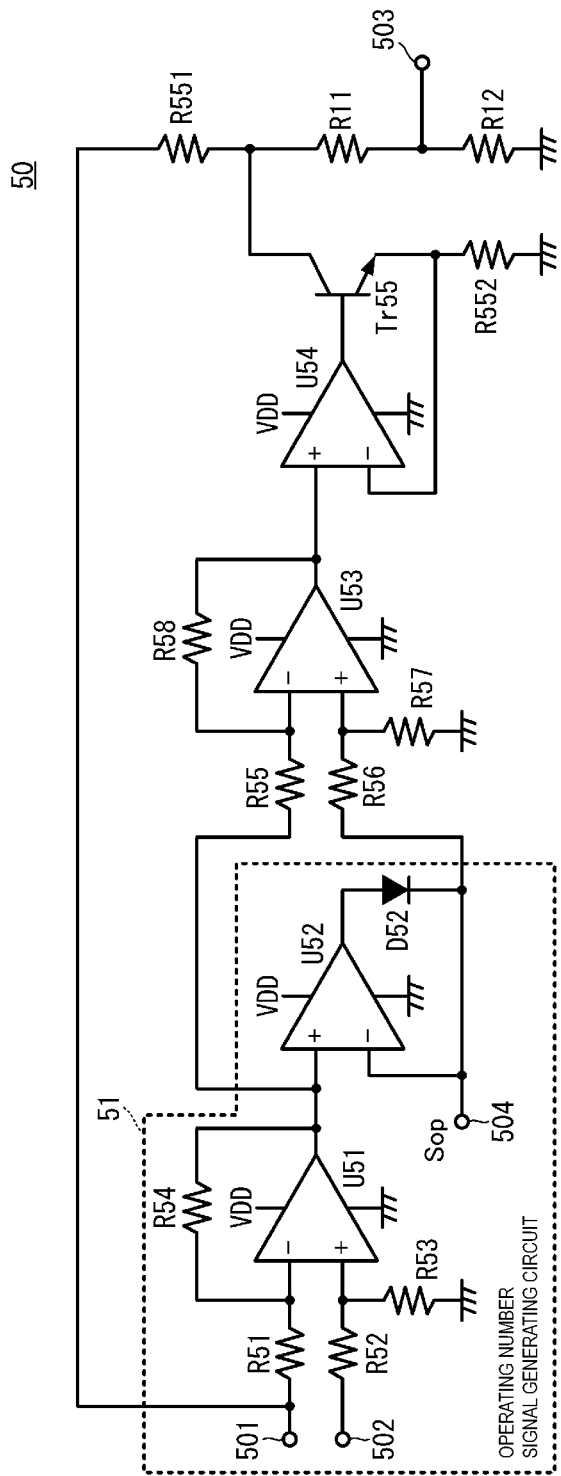
FIG. 2 is a circuit diagram of a feedback signal generating circuit in the first embodiment.

FIG. 2 is a circuit diagram of the feedback signal generating circuit 50 in the first embodiment. The feedback signal generating circuit 50 includes an amplifier U51, an amplifier U52, an amplifier U53, an amplifier U54, a transistor Tr55, a resistor R11, a resistor R12, a resistor R51, a resistor R52, a resistor R53, a resistor R54, a resistor R55, a resistor R56, a resistor R57, a resistor R58, a resistor R551, a resistor R552, and a diode D52.

An inverting input terminal of the amplifier U51 is connected to the terminal 501 with the resistor R51 interposed therebetween. A non-inverting input terminal of the amplifier U51 is connected to the terminal 502 with the resistor R52 interposed therebetween. The resistance of the resistor R51 is equal to the resistance of the resistor R52. The resistor R53 is connected between the non-inverting input terminal and the reference potential. An output terminal of the amplifier U51 is connected to the inverting input terminal of the amplifier U51 with the resistor R54 interposed therebetween. The resistance of the resistor R53 is equal to the resistance of the resistor R54. Drive power VDD is supplied to the amplifier U51.

A differential amplification circuit based on a potential difference between the terminal 501 and the terminal 502 is implemented by the circuit including the amplifier U51, the resistor R51, the resistor R52, the resistor R53, and the resistor R54. Accordingly, a signal based on a difference between the voltage of a connection point of the resistor RL and the capacitor CL, which are connected in parallel to the inductor L, and the output voltage Vout is amplified at a predetermined amplification factor and output from the output terminal of the amplifier U51. That is, an individual current amplification signal based on current iL flowing in the inductor L is output from the output terminal of the amplifier U51.

A non-inverting input terminal of the amplifier U52 is connected to the output terminal of the amplifier U51. An output terminal of the amplifier U52 is connected to an inverting input terminal of the amplifier U52 with the diode D52 interposed therebetween. The anode of the diode D52 is connected to the output terminal, and the cathode of the diode D52 is connected to the inverting input terminal. Drive power VDD is supplied to the amplifier U52.

A maximum value holding circuit is implemented by the circuit including the amplifier U52 and the diode D52.

The inverting input terminal of the amplifier U52 is connected to the inverting input terminal of the amplifier U52 of the feedback signal generating circuit 50 in another power conversion unit. Accordingly, the maximum value of the individual current amplification signals of the power conversion unit 31, the power conversion unit 32, the power conversion unit 33, and the power conversion unit 34 is held. The maximum value of the individual current amplification signals is output as an operating number signal Sop from the terminal 504.

As described above, a circuit including the amplifier U51, the amplifier U52, the resistor R51, the resistor R52, the resistor R53, the resistor R54, and the diode D52 serves as an operating number signal generating circuit 51. Part of the feedback signal generating circuit 50 forms the operating number signal generating circuit 51.

An inverting input terminal of the amplifier U53 is connected to the output terminal of the amplifier U51 with the resistor R55 interposed therebetween. A non-inverting input terminal of the amplifier U53 is connected to the cathode of the diode D52 and the terminal 504 with the resistor R56 interposed therebetween. The resistance of the resistor R55 is equal to the resistance of the resistor R56. The resistor R57 is connected between the non-inverting input terminal of the amplifier U53 and the reference potential. An output terminal of the amplifier U53 is connected to the inverting input terminal of the amplifier U53 with the resistor R58 interposed therebetween. The resistance of the resistor R57 is equal to the resistance of the resistor R58. Drive power VDD is supplied to the amplifier U53.

A differential amplification circuit based on the potential difference between the individual current amplification signal and the operating number signal Sop is implemented by the circuit including the amplifier U53, the resistor R55, the resistor R56, the resistor R57, and the resistor R58. Accordingly, a differential signal of the individual current amplification signal and the operating number signal Sop (maximum value holding signal) is output from the output terminal of the amplifier U53.

A non-inverting input terminal of the amplifier U54 is connected to the output terminal of the amplifier U53. An output terminal of the amplifier U54 is connected to the base of the transistor Tr55, which is of an NPN type. The collector of the transistor Tr55 is connected to the terminal 501 with the resistor R551 interposed therebetween. The emitter of the transistor Tr55 is connected to the ground reference potential with the resistor R552 interposed therebetween. The emitter of the transistor Tr55 is also connected to an inverting input terminal of the amplifier U54. Furthermore, a connection point of the collector of the transistor Tr55 and the resistor R551 is connected to the ground reference potential with a series circuit including a resistor R11 and a resistor R12 interposed therebetween. A connection point of the resistor R11 and the resistor R12 is connected to the terminal 503.

A circuit including the amplifier U54, the transistor Tr55, and the resistor R552 form a voltage-current conversion circuit. Specifically, in this circuit, when a differential signal (differential voltage) is applied to the non-inverting input terminal of the amplifier U54, a differential signal (differential current Iadj) flows between the collector and the emitter of the transistor Tr55. This differential current Iadj corresponds to an individual current feedback signal.

Due to the differential current Iadj flowing, the voltage of the connection point (collector of the transistor Tr55) between the resistor R551 and the resistor R11 becomes Vout−(Rr551×Iadj), where Rr551 represents the resistance of the resistor R551.

As a result, voltages obtained by dividing the voltage represented by Vout−(Rr551×Iadj) by the resistor R11 and the resistor R12 are output to the terminal 503. That is, the difference between the individual current amplification signal and the operating number signal Sop (maximum value holding signal) and the voltage corresponding to the output voltage Vout are output to the terminal 503. In other words, the individual current feedback signal and the individual voltage feedback signal, which is determined on the basis of the resistances of the resistor R551, the resistor R11, and the resistor R12 and the output voltage Vout, are combined together and are output as a composite feedback signal to the terminal 503. The composite feedback signal is fed back to the PWM control IC 40.

With the configuration described above, each of the power conversion unit 31, the power conversion unit 32, the power conversion unit 33, and the power conversion unit 34 operates to reduce the difference between the individual current amplification signal and the operating number signal Sop (maximum value holding signal) and control an output current and an output voltage to be stable desired values.

Furthermore, the power conversion unit 31, the power conversion unit 32, the power conversion unit 33, and the power conversion unit 34 are formed of analog circuits. Thus, with a simple circuit configuration, composite feedback signals are fed back to the PWM control IC 40 at high speed.

The operating number signal Sop is input to the MPU 20, as described above. The MPU 20 determines, on the basis of the operating number signal Sop, the number of power conversion units to operate, and generates control signals.

Figure 3:
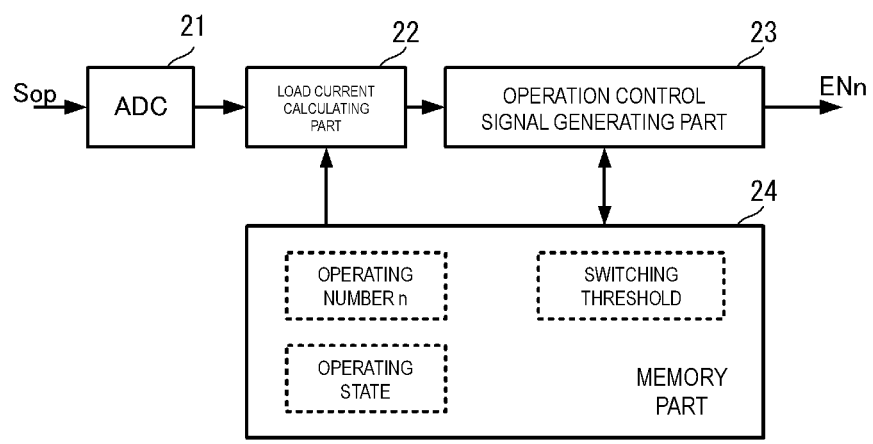
FIG. 3 is a functional block diagram of an MPU in the first embodiment.

FIG. 3 is a functional block diagram of the MPU 20 in the first embodiment. As illustrated in FIG. 3, the MPU 20 includes an ADC 21, a load current calculating part 22, an operation control signal generating part 23, and a memory part 24.

An operating number, an operating state, and a switching threshold are stored in the memory part 24. That is, the MPU 20 holds an operating number, an operating state, and a switching threshold. An operating number n represents the number of power conversion units that are currently operating. An operating state includes the phase of a clock oscillation control signal (oscillation signal) supplied to an operating power conversion unit, for example, in the case where a plurality of power conversion units are operating, phases of clock oscillation control signals (oscillation signals) output to the plurality of power conversion units or a phase difference between the clock oscillation control signals (oscillation signals). A switching threshold represents a load current value Iz as a criterion for the determination of switching of the operating number.

The ADC 21 is an analog-to-digital conversion circuit and converts an operating number signal Sop, which is an analog signal, into a digital signal.

The load current calculating part 22 calculates a load current value Iz from the operating number signal Sop. Specifically, the load current calculating part 22 reads the operating number n from the memory part 24. The load current calculating part 22 calculates a load current value Iz by multiplying the operating number signal Sop by the operating number n. Arithmetic operation may be performed by an arithmetic operation based on a gain of conversion to a voltage corresponding to current flowing in the inductor L and a voltage gain at the operating number signal generating circuit 51. The load current calculating part 22 outputs the load current value Iz to the operation control signal generating part 23.

The operation control signal generating part 23 reads a switching threshold TH from the memory part 24. The operation control signal generating part 23 compares the load current value Iz with the switching threshold TH, and determines the operating number n on the basis of the result of the comparison.

Specifically, the operation control signal generating part 23 determines the operating number n on the basis of a principle described below.

Figure 4:
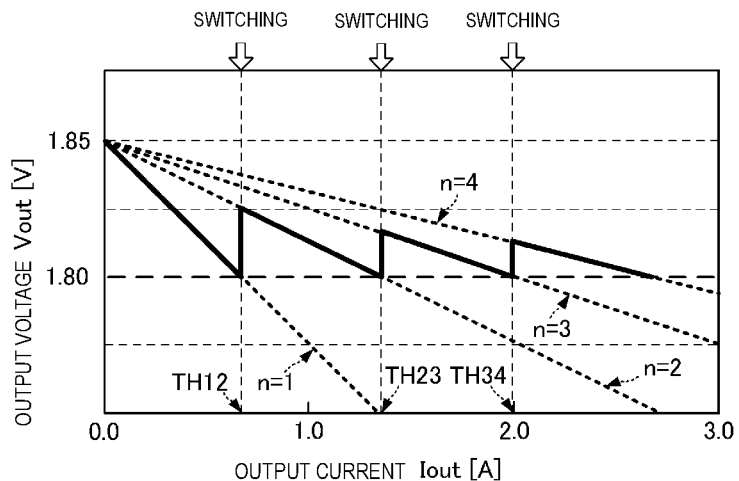
FIG. 4 is a diagram for explaining the concept of switching an operating number.

FIG. 4 is a diagram for explaining the concept of switching of an operating number. FIG. 4 is a graph indicating the relationship between output voltage and output current in a circuit configuration in which a plurality of power conversion units are connected in parallel to one another. The horizontal axis represents the output current, and the vertical axis represents the output voltage.

The output voltage Vout and the output current Iout have a relationship expressed by an equation provided below, where the number of operating power conversion units that are connected in parallel to one another is represented by n, the resistance of the power conversion units is represented by r, and the input voltage is represented by Vin.

$$Vout = Vin - (r/n)Iout \qquad \text{(Equation 1)}$$

The input voltage Vin is constant. With the relationship mentioned above, output characteristics represented by dotted lines indicated in FIG. 4 can be obtained. As indicated by the dotted lines, as the operating number n becomes larger, a larger output current Iout can be obtained without the output voltage Vout being reduced. That is, as the operating number n increases, a larger load current can be obtained with low loss with respect to a stable desired output voltage Vout.

For example, as illustrated in FIG. 4, the input voltage Vin is set to 1.85 [V], and the minimum value of the output voltage is set to 1.80 [V].

The operation control signal generating part 23 uses the output current (load current) Iout at the time when output characteristics for each operating number n reach 1.80 [V] as the switching threshold. For example, in the example of FIG. 4, a switching threshold TH12 for switching the operating number n from 1 to 2 is set on the basis of the output current Iout at the time when the output voltage Vout reaches 1.80 [V] in the output characteristics for the operating number n=1. In a similar manner, a switching threshold TH23 for switching the operating number n from 3 to 3 is set on the basis of the output current Iout at the time when the output voltage Vout reaches 1.80 [V] in the output characteristics for the operating number n=2. Furthermore, a switching threshold TH34 for switching the operating number n from 3 to 4 is set on the basis of the output current Iout at the time when the output voltage Vout reaches 1.80 [V] in the output characteristics for the operating number n=3.

In the case where the load current value Iz is greater than the switching threshold TH12 when the operating number n is "1", the operation control signal generating part 23 switches the operating number n to "2". In a similar manner, in the case where the load current value Iz is greater than the switching threshold TH23 when the operating number n is "2", the operation control signal generating part 23 switches the operating number n to "3". Furthermore, in a similar manner, in the case where the load current value Iz is greater than the switching threshold TH23 when the operating number n is "3", the operation control signal generating part 23 switches the operating number n to "4". For example, in the case where the load current abruptly changes and the load current value Iz exceeds the switching threshold TH23 when the operating number n is "1", the operation control signal generating part 23 may switch the operating number n from "1" to "3".

The same principle as the above-described principle of increasing the operating number n may be used for a switching threshold for decreasing the operating number n and the principle of decreasing the operating number n.

After determining the operating number n, the operation control signal generating part 23 determines a power conversion unit(s) that are to operate, in accordance with the operating number n. At this time, for example, the operation control signal generating part 23 refers to an operating state read from the memory part 24 and determines a power conversion unit(s) that are to operate. Specifically, for example, in the case where one power conversion unit, the power conversion unit 31, is operating and the other three power conversion units, the power conversion unit 32, the power conversion unit 33, and the power conversion unit 34, are stopped (not operating), the operating number n is changed to "2". The operation control signal generating part 23 reads, based on the operating state, the fact that the power conversion unit 31 is in an operating state, and performs setting such that any one of the power conversion unit 32, the power conversion unit 33, and the power conversion unit 34 that are not in the operating state is to operate. That is, the power conversion unit 31, which is currently operating, is made to continuously operate without stopping, and any one of the power conversion unit 32, the power conversion unit 33, and the power conversion unit 34, which are not in the operating state, is made to start operating.

The operation control signal generating part 23 generates a control signal including the clock oscillation control signal and the enable signal or the disable signal described above, and outputs the control signal to each of the power conversion units that operate after switching of the operating number n. At this time, the operation control signal generating part 23 determines the phase difference among the clock oscillation control signals included in the control signals in accordance with the operating number n.

As described above, with the configuration in this embodiment, the power supply device 10 is capable of properly changing the operating number n in accordance with the load current value Iz, while measuring the load current value Iz (output current Iout). Accordingly, the power supply device 10 is capable of performing automatic control for outputting a desired output current Iout while maintaining a stable output voltage Vout.

Furthermore, in the power supply device 10, the power conversion unit 31, the power conversion unit 32, the power conversion unit 33, and the power conversion unit 34 perform PWM control using feedback voltage signals and feedback current signals. Accordingly, the power supply device 10 is able to obtain more accurate and stable output characteristics.

Furthermore, in the power supply device 10, with the use of the MPU 20, which performs digital signal processing, for the processing for switching the operating number n, a circuit that performs the processing for switching the operating number n can be implemented by a simple configuration.

Meanwhile, in the power supply device 10, a circuit that performs PWM control on the basis of a feedback current signal and a feedback voltage signal is implemented by an analog circuit. Accordingly, the power supply device 10 is capable of quickly feeding back a feedback current signal and a feedback voltage signal and performing accurate PWM control with high real-time performance with respect to the state of a load.

That is, the power supply device 10 is able to implement, with a simple configuration, a circuit that implements both switching of the operating number n according to the state of a load and stable output according to the state of the load.

In the explanation provided above, an aspect in which processing is performed in a state in which the MPU 20 is divided into a plurality of functional blocks. However, by performing a process illustrated in FIG. 5 by an arithmetic device that performs digital processing, processing similar to that performed by the MPU 20 can be performed.

Figure 5:
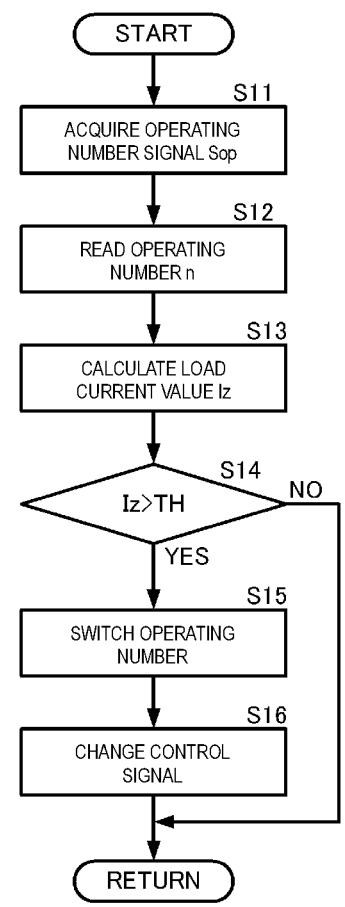
FIG. 5 is a flowchart illustrating a process for switching an operating number.

FIG. 5 is a flowchart illustrating a process for switching an operating number. The specific details of each processing operations have been described above, and detailed explanations will be omitted. Furthermore, FIG. 5 is a flowchart of a process for increasing an operating number.

As illustrated in FIG. 5, the arithmetic device acquires an operating number signal Sop (S11). The arithmetic device reads an operating number n that the arithmetic device holds (S12).

The arithmetic device calculates the load current value Iz on the basis of the operating number signal Sop and the operating number n (S13). In the case where the load current value Iz is greater than a switching threshold TH (S14: YES), the arithmetic device performs switching such that the operating number n is increased (S15). The arithmetic device changes a control signal in accordance with the switched operating number n (S16).

In the case where the load current value Iz is smaller than or equal to the switching threshold TH (S14: NO), the arithmetic device maintains the operating number n and continuously outputs an original control signal.

A process for decreasing the operating number n can be implemented by, for example, performing switching such that the operating number n is decreased in the case where the load current value Iz is smaller than the switching threshold TH.

Second Embodiment

Figure 6:
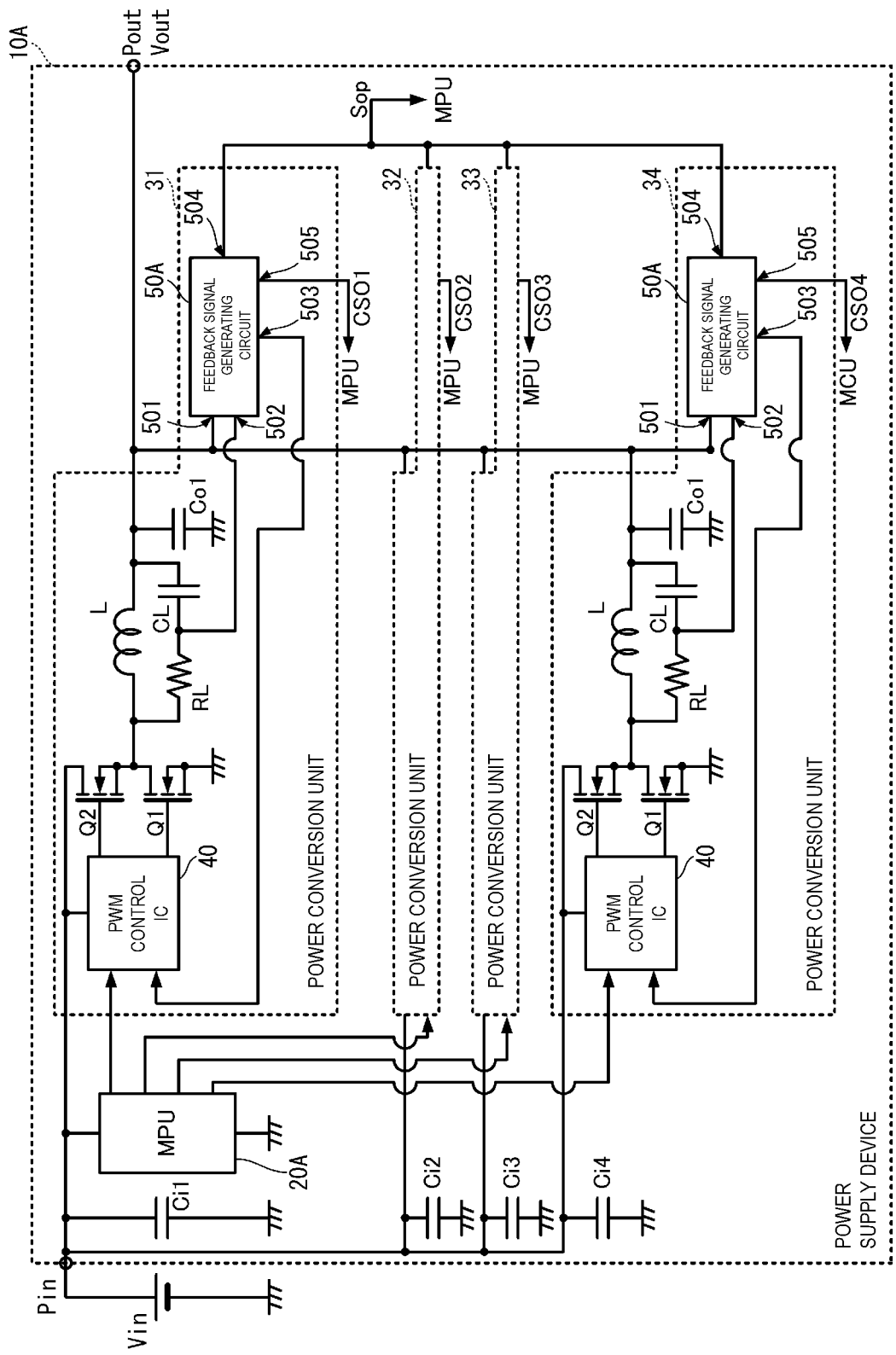
FIG. 6 is a circuit block diagram of a power supply device according to a second embodiment.

A power supply device according to a second embodiment of the present disclosure will be described with reference to drawings. FIG. 6 is a circuit block diagram of a power supply device 10A according to the second embodiment.

As illustrated in FIG. 6, the power supply device 10A according to the second embodiment is different from the power supply device 10 according to the first embodiment in the configuration of an MPU 20A and a feedback signal generating circuit 50A. The other configuration features of the power supply device 10A are similar to those of the power supply device 10, and explanation for those similar parts will be omitted.

The power supply device 10A includes the MPU 20A, the power conversion unit 31, the power conversion unit 32, the power conversion unit 33, and the power conversion unit 34. The power conversion unit 31, the power conversion unit 32, the power conversion unit 33, and the power conversion unit 34 each include the feedback signal generating circuit 50A.

Figure 7:
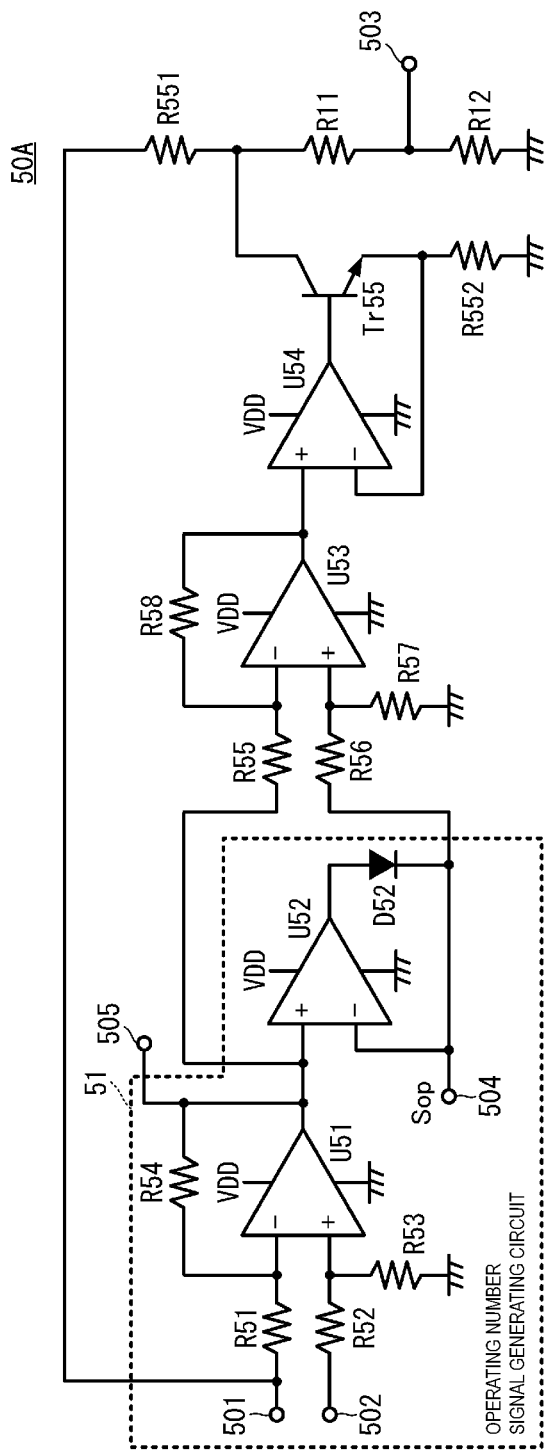
FIG. 7 is a circuit diagram of a feedback signal generating circuit in the second embodiment.

FIG. 7 is a circuit diagram of the feedback signal generating circuit 50A in the second embodiment. As illustrated in FIG. 7, the feedback signal generating circuit 50A is different from the feedback signal generating circuit 50 in the first embodiment in that a terminal 505 is added. The other configuration features of the feedback signal generating circuit 50A are similar to those of the feedback signal generating circuit 50, and explanation for those similar parts will be omitted.

The terminal 505 is connected to the output terminal of the amplifier U51. Accordingly, an individual current amplification signal CSO is output from the terminal 505. Specifically, an individual current amplification signal CSO1 corresponding to the operating state of the power conversion unit 31 is output through the terminal 505 of the feedback signal generating circuit 50A of the power conversion unit 31. An individual current amplification signal CSO2 corresponding to the operating state of the power conversion unit 32 is output through the terminal 505 of the feedback signal generating circuit 50A of the power conversion unit 32. An individual current amplification signal CSO3 corresponding to the operating state of the power conversion unit 33 is output through the terminal 505 of the feedback signal generating circuit 50A of the power conversion unit 33. An individual current amplification signal CSO4 corresponding to the operating state of the power conversion unit 34 is output through the terminal 505 of the feedback signal generating circuit 50A of the power conversion unit 34.

The power conversion unit 31 outputs the individual current amplification signal CSO1 to the MPU 20A. The power conversion unit 32 outputs the individual current amplification signal CSO2 to the MPU 20A. The power conversion unit 33 outputs the individual current amplification signal CSO3 to the MPU 20A. The power conversion unit 34 outputs the individual current amplification signal CSO4 to the MPU 20A.

Figure 8:
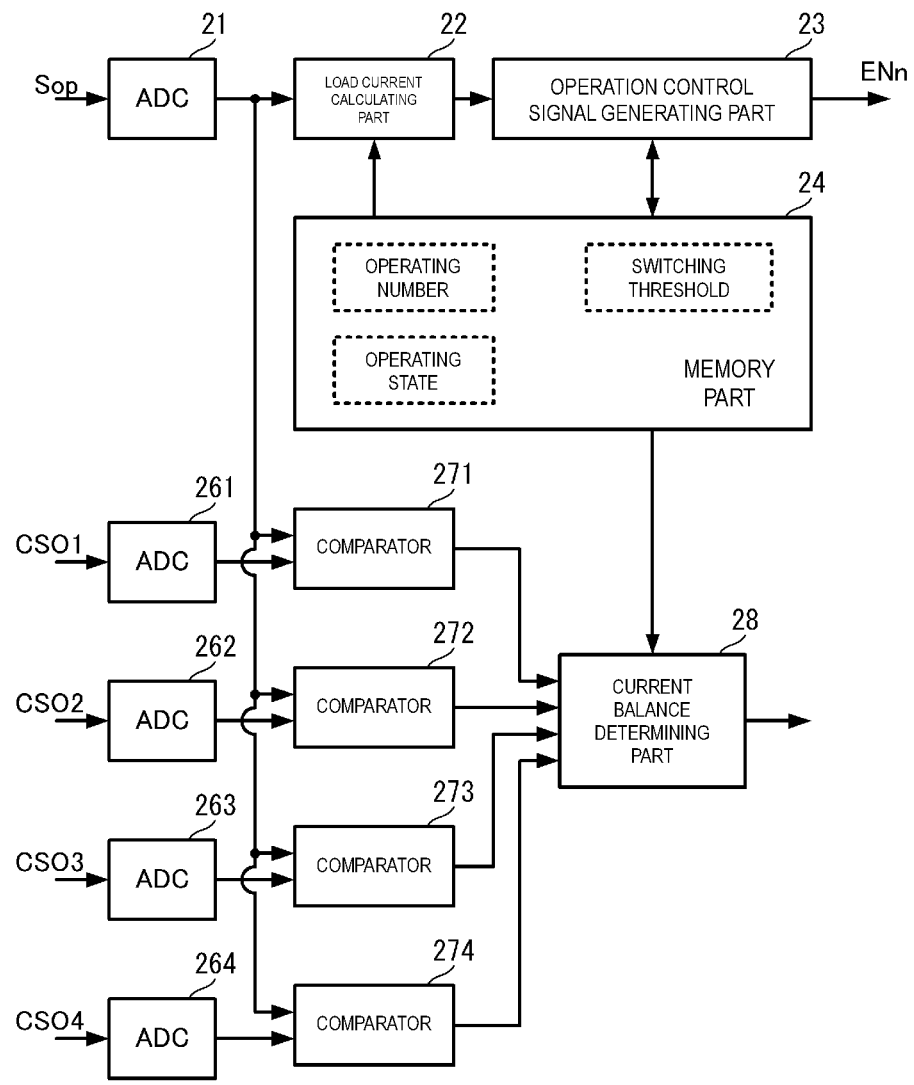
FIG. 8 is a functional block diagram of an MPU in the second embodiment.

FIG. 8 is a functional block diagram of the MPU 20A in the second embodiment. As illustrated in FIG. 8, compared to the MPU 20 in the first embodiment, the MPU 20A includes an ADC 261, an ADC 262, an ADC 263, an ADC 264, a comparator 271, a comparator 272, a comparator 273, a comparator 274, and a current balance determining part 28.

The ADC 261, the ADC 262, the ADC 263, and the ADC 264 are analog-to-digital conversion circuits. The ADC 261 converts the individual current amplification signal CSO1, which is an analog signal, into a digital signal. The ADC 262 converts the individual current amplification signal CS 02, which is an analog signal, into a digital signal. The ADC 263 converts the individual current amplification signal CSO3, which is an analog signal, into a digital signal. The ADC 264 converts the individual current amplification signal CSO4, which is an analog signal, into a digital signal.

The comparator 271 compares the individual current amplification signal CSO1 with the operating number signal Sop and outputs the result of the comparison. The comparator 272 compares the individual current amplification signal CSO2 with the operating number signal Sop and outputs the result of the comparison. The comparator 273 compares the individual current amplification signal CSO3 with the operating number signal Sop and outputs the result of the comparison. The comparator 274 compares the individual current amplification signal CSO4 with the operating number signal Sop and outputs the result of the comparison.

As described above, the operating number signal Sop is a signal indicating the maximum value of individual current amplification signals. Thus, by the processing described above, the comparator 271, the comparator 272, the comparator 273, and the comparator 274 may obtain variations among the individual current amplification signals for the power conversion unit 31, the power conversion unit 32, the power conversion unit 33, and the power conversion unit 34.

The current balance determining part 28 determines the balance among the individual current amplification signals for the power conversion unit 31, the power conversion unit 32, the power conversion unit 33, and the power conversion unit 34, in accordance with the results of the comparison by the comparator 271, the comparator 272, the comparator 273, and the comparator 274. At this time, the current balance determining part 28 reads the operating state from the memory part 24, and determines the balance on the basis of only power conversion units that are operating.

For example, in the case where the result of comparison by the comparator 271 is significantly different from the results of comparisons by the comparator 272, the comparator 273 and the comparator 274, the current balance determining part 28 determines that the balance among the individual current amplification signals for the power conversion unit 31, the power conversion unit 32, the power conversion unit 33, and the power conversion unit 34 is lost. Thus, for example, the current balance determining part 28 determines that there may a failure in the operation of the power conversion unit 31. For example, the current balance determining part 28 generates and outputs an alert signal in accordance with the results of the determination.

With this configuration, the power supply device 10A can obtain operational effects similar to those obtained by the power supply device 10 and can determine the operating state of a plurality of power conversion units that are operating.

Third Embodiment

Figure 9:
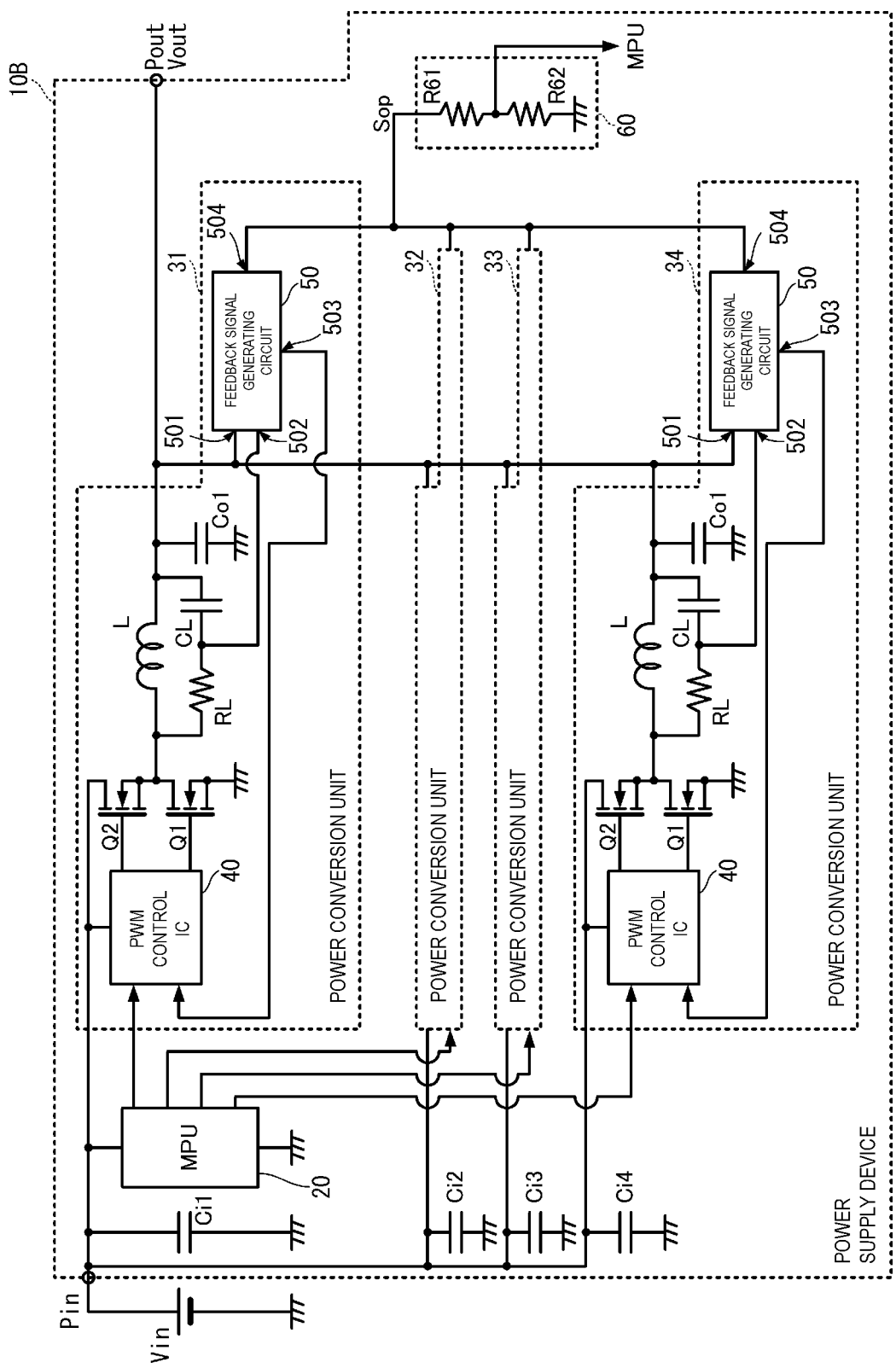
FIG. 9 is a circuit block diagram of a power supply device according to a third embodiment.

A power supply device according to a third embodiment of the present disclosure will be described with reference to drawings. FIG. 9 is a circuit block diagram of a power supply device 10B according to the third embodiment.

As illustrated in FIG. 9, the power supply device 10B according to the third embodiment is different from the power supply device 10 according to the first embodiment in that a voltage-dividing circuit 60 is provided. The other configuration features of the power supply device 10B are similar to those of the power supply device 10, and explanation for those similar parts will be omitted.

The voltage-dividing circuit 60 is connected between a connection line of the terminal 504 of the power conversion unit 31, the terminal 504 of the power conversion unit 32, the terminal 504 of the power conversion unit 33, and the terminal 504 of the power conversion unit 34 and the MPU 20.

The voltage-dividing circuit 60 includes a resistor R61 and a resistor R62. The resistor R61 and the resistor R62 are connected in series to each other, and this series circuit is connected between the connection line of the plurality of terminals 504 described above and the reference potential. A connection point (voltage division point) of the resistor R61 and the resistor R62 is connected to the MPU 20.

The voltage-dividing circuit 60 divides the voltage of the operating number signal Sop and outputs the voltage-divided operating number signal Sop to the MPU 20.

With the configuration described above, the voltage of the operating number signal Sop that is input to the MPU 20 is reduced. Thus, the voltage of the operating number signal Sop can be prevented from exceeding the power supply voltage of the MPU 20. Accordingly, a reliable operation of the MPU 20 described above can be achieved.

The voltage-dividing circuit 60 may also be connected to the terminals 505 in the power supply device 10A according to the second embodiment. Thus, the voltage of an individual current amplification signal can be prevented from exceeding the power supply voltage of the MPU 20. Accordingly, a reliable operation of the MPU 20 described above can be achieved.

Fourth Embodiment

Figure 10:
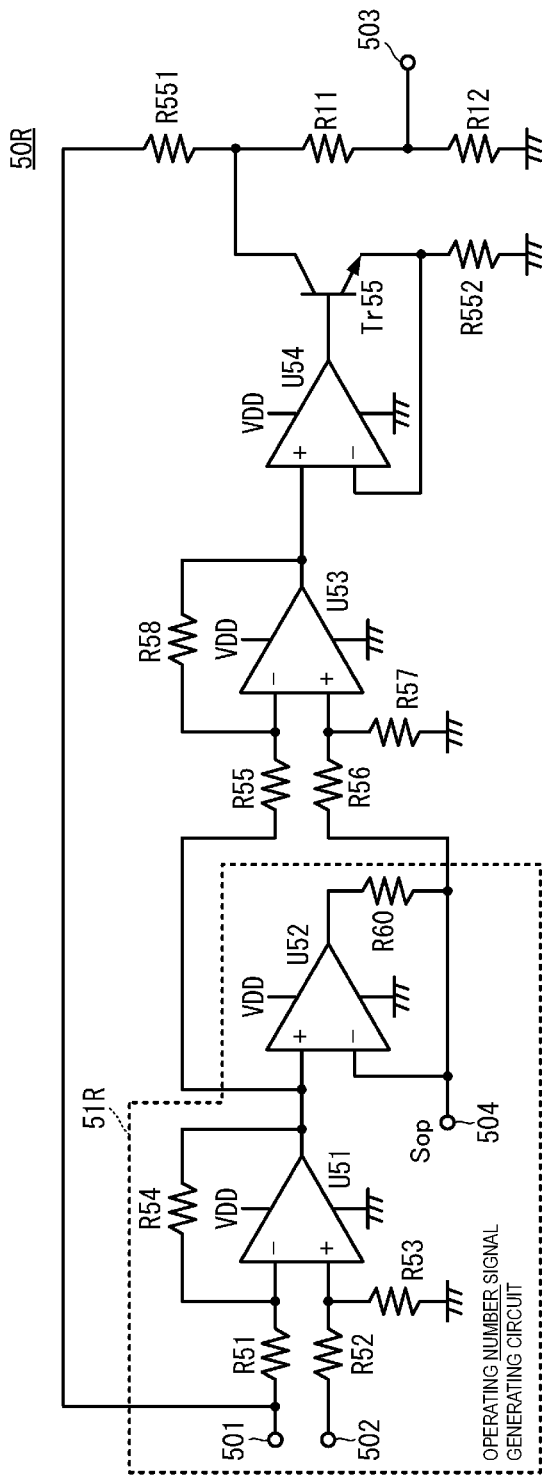
FIG. 10 is a circuit block diagram of a feedback signal generating circuit of a power supply device according to a fourth embodiment.

A power supply device according to a fourth embodiment of the present disclosure will be described with reference to drawings. FIG. 10 is a circuit block diagram of a feedback signal generating circuit 50R in the power supply device according to the fourth embodiment.

As illustrated in FIG. 10, the feedback signal generating circuit 50R of the power supply device according to the fourth embodiment is different from the feedback signal generating circuit 50 of the power supply device 10 according to the first embodiment in that a resistor R60 is provided in place of the diode D52. Other configuration features of the feedback signal generating circuit 50R are similar to those of the feedback signal generating circuit 50, and explanation for those similar parts will be omitted.

The feedback signal generating circuit 50R includes the resistor R60. The resistor R60 is connected between the output terminal and the inverting input terminal of the amplifier U52. With this configuration, an average value calculation circuit including the amplifier U52 and the resistor R60 is implemented.

The feedback signal generating circuit 50R outputs this average value signal as an operating number signal Sop. Accordingly, processing similar to that for the maximum value signal described above can also be achieved by using the average value signal as the operating number signal Sop.

Regarding configurations of the embodiments described above, an aspect in which switching of an operating number and the like are performed with reference only to the operating number signal Sop has been described. However, by receiving an instruction signal from a load device to which a power supply device is connected and power is supplied and referring to the instruction signal, switching of the operating number and the like may also be performed.

Furthermore, configurations of the embodiments described above can be combined in an appropriate manner, and operational effects corresponding to various combinations can be achieved.

What is claimed is:

1. A system power supply device comprising:
    a plurality of power converters, each including an inductor, a switching circuit, an individual analog controller, and a feedback signal generating circuit;
    a common controller configured to output control signals to the plurality of power converters;
    a common output terminal that is connected to output parts of the plurality of power converters in parallel; and
    operating number signal generating circuits configured to generate an operating number signal on the basis of individual current signals based on current flowing in the inductors of the plurality of power converters and output the operating number signal to the common controller,
    wherein
    each of the feedback signal generating circuits of the plurality of power converters is configured to provide a composite feedback signal to the respective individual analog controller based on a voltage feedback signal and a current feedback signal,
    the common controller is configured to set operations of the individual analog controllers of the plurality of power converters on the basis of the operating number signal and output the control signals including settings of operation modes of the individual analog controllers, and
    an operating number of the plurality of power converters that are operating is switched in accordance with an operation mode and power consumption of a load connected to the common output terminal.

2. The system power supply device according to claim 1, wherein
    the common controller is configured to
        hold a switching threshold for the operating number, and
        compare the operating number signal with the switching threshold and set the operations of the individual analog controllers of the plurality of power converters.

3. The system power supply device according to claim 1, wherein
    the common controller is configured to set, as the operations of the individual analog controllers of the plurality of power converters, the operations to be enabled or disabled.

4. The system power supply device according to claim 3, wherein
    the common controller is configured to set operation modes of the switching circuits as the operations of the individual analog controllers of the plurality of power converters.

5. The system power supply device according to claim 1, wherein
    the operating number signal generating circuits are configured to generate the operating number signal on the basis of a maximum value of the individual current signals for the plurality of power converters.

6. The system power supply device according to claim 1, wherein
    the operating number signal is generated on the basis of an average value of the individual current signals for the plurality of power converters.

7. The system power supply device according to claim 1, wherein
    the feedback signal generating circuits of the plurality of power converters are further configured to generate, on the basis of a difference between sizes of the individual current signals for the plurality of power converters and a size of the operating number signal, additional feedback signals to be fed back to the plurality of power converters,
    wherein part of the feedback signal generating circuits configure the operating number signal generating circuits.

8. The system power supply device according to claim 1, wherein
    the common controller is configured to output the control signals including clock oscillation control signals in which phases of switching frequencies for the plurality of power converters are shifted from one another.

9. The system power supply device according to claim 1, wherein
    the common controller is configured to perform signal processing in accordance with an instruction signal from an outside connected to the common output terminal and sets the operations of the individual analog controllers of the plurality of power converters.

10. The system power supply device according to claim 1, wherein
the individual analog controllers are each configured of a PWM control IC.

11. The system power supply device according to claim 1, wherein
the common controller is configured of a programmable microprocessor.

12. The system power supply device according to claim 2, wherein
the common controller is configured to set, as the operations of the individual analog controllers of the plurality of power converters, the operations to be enabled or disabled.

13. The system power supply device according to claim 2, wherein
the operating number signal generating circuits are configured to generate the operating number signal on the basis of a maximum value of the individual current signals for the plurality of power converters.

14. The system power supply device according to claim 3, wherein
the operating number signal generating circuits are configured to generate the operating number signal on the basis of a maximum value of the individual current signals for the plurality of power converters.

15. The system power supply device according to claim 2, wherein
the operating number signal is generated on the basis of an average value of the individual current signals for the plurality of power converters.

16. The system power supply device according to claim 2, wherein
the feedback signal generating circuits of the plurality of power converters are further configured to generate, on the basis of a difference between sizes of the individual current signals for the plurality of power converters and a size of the operating number signal, additional feedback signals to be fed back to the plurality of power converters,
wherein part of the feedback signal generating circuits configure the operating number signal generating circuits.

17. The system power supply device according to claim 2, wherein
the common controller is configured to output the control signals including clock oscillation control signals in which phases of switching frequencies for the plurality of power converters are shifted from one another.

18. The system power supply device according to claim 2, wherein
the common controller is configured to perform signal processing in accordance with an instruction signal from an outside connected to the common output terminal and sets the operations of the individual analog controllers of the plurality of power converters.

19. The system power supply device according to claim 2, wherein
the individual analog controllers are each configured of a PWM control IC.

20. The system power supply device according to claim 2, wherein
the common controller is configured of a programmable microprocessor.

* * * * *